United States Patent [19]
Lénberg

[11] Patent Number: 5,769,118
[45] Date of Patent: Jun. 23, 1998

[54] POSITION INDICATING VALVE WHEEL

[75] Inventor: Lars Lénberg, Nossebro, Sweden

[73] Assignee: Tour & Andersson Hydronics AB, Ljung, Sweden

[21] Appl. No.: 491,912
[22] PCT Filed: Feb. 10, 1994
[86] PCT No.: PCT/SE94/00106
  § 371 Date: Jul. 18, 1995
  § 102(e) Date: Jul. 18, 1995
[87] PCT Pub. No.: WO94/19636
  PCT Pub. Date: Sep. 1, 1994

[30] Foreign Application Priority Data

Feb. 25, 1993 [SE] Sweden .................................. 9300642

[51] Int. Cl.[6] ............................. F16K 37/00; F16K 31/60
[52] U.S. Cl. .......................... 137/553; 137/556; 116/277; 116/318; 116/305
[58] Field of Search ..................... 137/552, 553, 137/556; 116/277, 309, 318, 284, 305

[56] References Cited

U.S. PATENT DOCUMENTS

| 2,752,878 | 7/1956 | Keough | 116/277 |
| 2,767,681 | 10/1956 | Pontius | 137/553 |
| 3,450,091 | 6/1969 | Wajdik | 116/298 |
| 4,893,582 | 1/1990 | Kalamon et al. | 116/277 |
| 5,316,040 | 5/1994 | Townsend et al. | 137/556 |

FOREIGN PATENT DOCUMENTS

| 1 775 594 | 9/1974 | Germany . | |
| 8504322-2 | 9/1985 | Germany | 137/553 |

Primary Examiner—Edward K. Look
Assistant Examiner—Michael S. Lee
Attorney, Agent, or Firm—Davis and Bujold

[57] ABSTRACT

A position indicating valve wheel (1) having a digit ring (28) in rotating communication with an intermediate wheel (35), both of which are rotatably mounted in a wheel house (1). A driver (51) secured to a flange (48) of a decimal ring (40) which is also rotatably mounted in the wheel house (1). The driver (51) being engageable with the intermediate wheel (35) once every full rotation of the wheel house (1). A resilient collar (49) extending from the flange (48) and engageable with the wheel house (1). An exposed surface (29) of the digit ring (28) and an exposed flange (41) of the decimal ring (40) being located adjacent windows (20, 21) provided in the wheel house (1). A concentric sleeve (43) extended from the decimal ring and releasably mounted to a valve top piece (44).

20 Claims, 3 Drawing Sheets

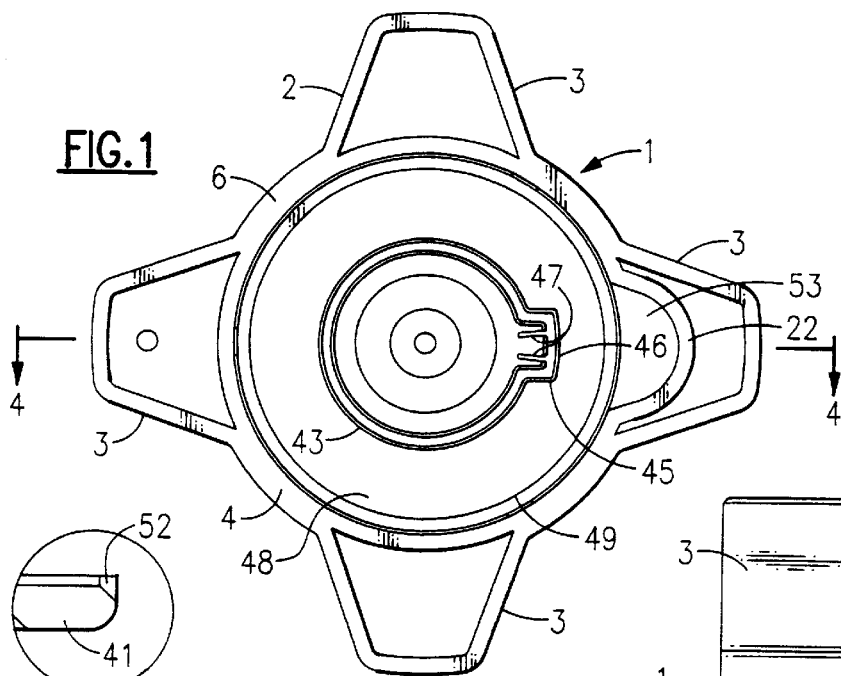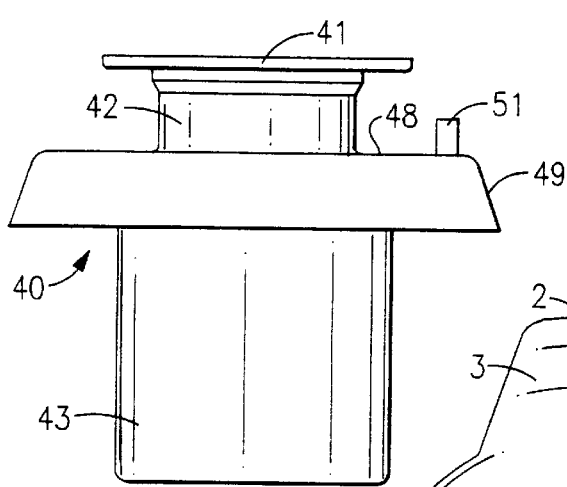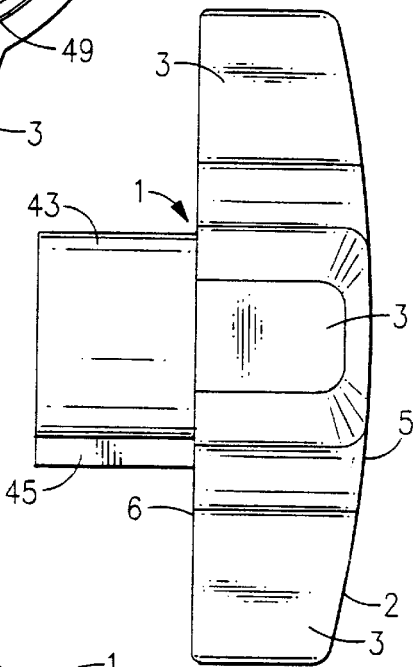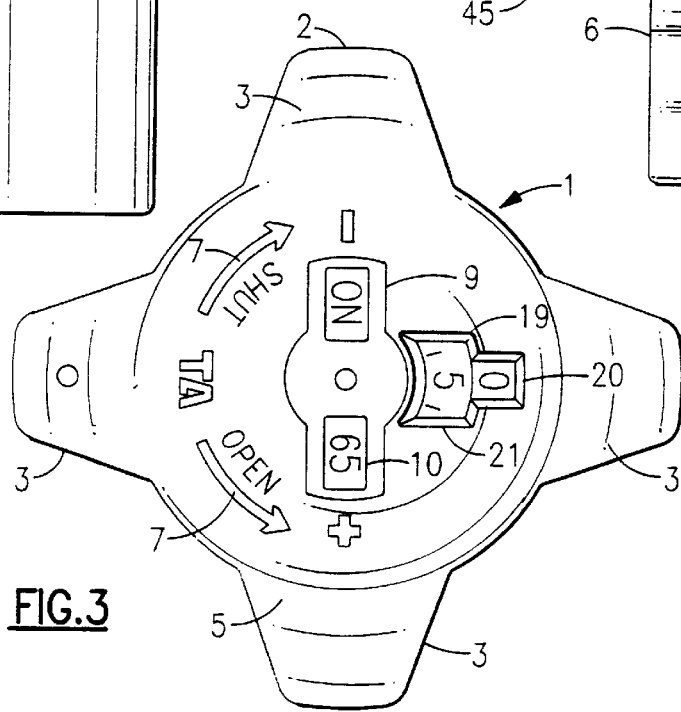

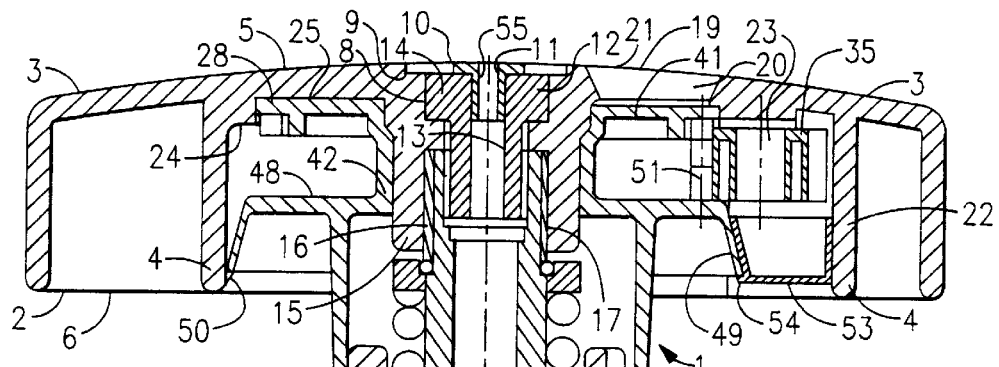
FIG.4
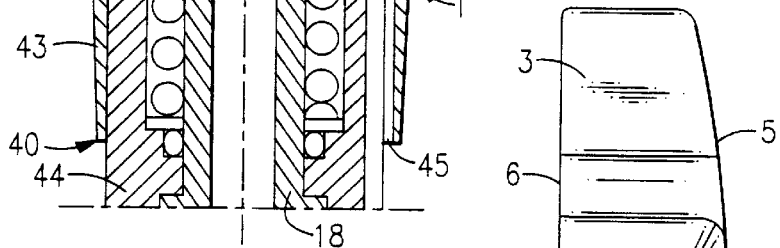
FIG.6
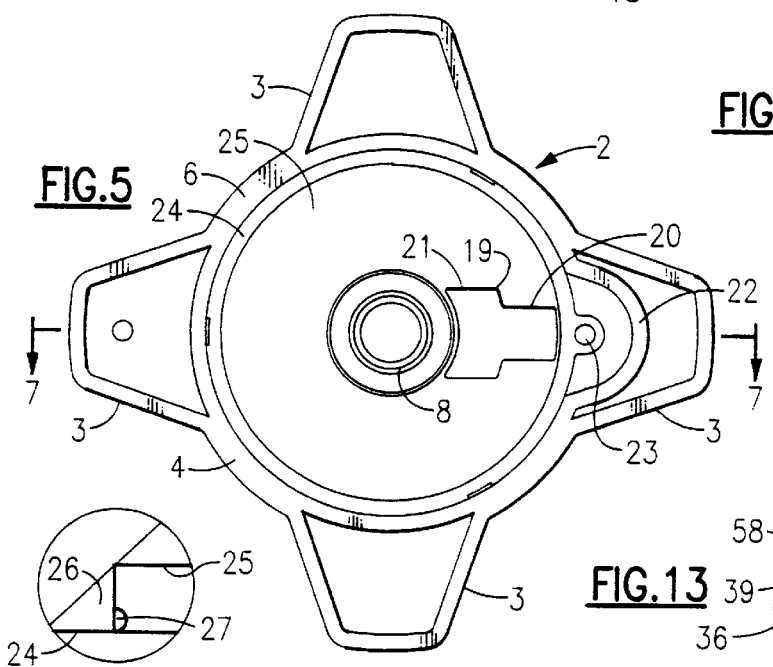
FIG.5
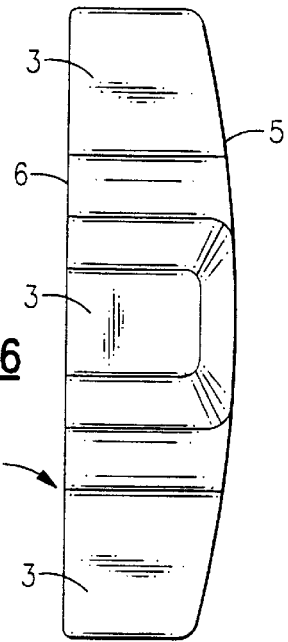
FIG.13
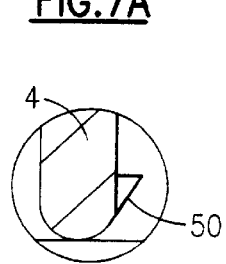
FIG.7A
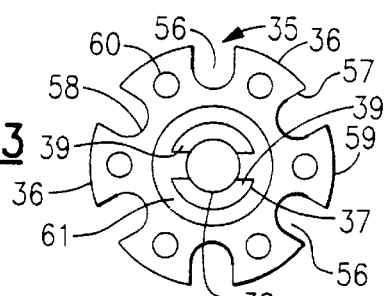
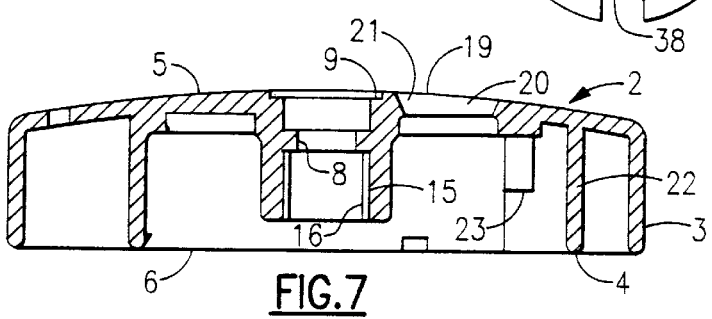
FIG.7B   FIG.7

POSITION INDICATING VALVE WHEEL

FIELD OF THE INVENTION

The present invention relates to valve wheels in general, and more particularly to valve wheels that have a mechanism to indicate the position of a valve body.

BACKGROUND OF THE INVENTION

Valve wheels or handles are used to adjust heating systems, and the like. A person may turn the valve wheel, thus causing the valve body to move between an open position and a closed position.

Document SE-B-448 651 discloses a valve wheel having a means to indicate the position of the valve body. However, this valve wheel is not without shortcomings. First, the means allow a limited number of turns. Second, the indicated position may result in an inaccurate reading, particularly within a transition area from a partial turn to a completed turn of the valve wheel. Finally, a person is inconvenienced when reading the indicated position. The position indicating means for full turns and portions of a turn rotate together, however the windows for the respective indications are separated.

The objects of the present invention are to counteract and remove these inconveniences and produce a position indicating valve wheel that allows a larger number of turns and a quick and clear position reading.

SUMMARY OF THE INVENTION

The invention resides in a position indicating valve wheel comprising a wheel house having means to indicate the position of a valve body by showing a full turn as well as a partial turn. The means comprise two rotary elements that interact with each other, but each one provides its own indication. The first rotary element is a decimal ring that provides a flexible partial turn indication, whereas the second rotary element is a digit ring that is influenced by the decimal ring once per completed turn of the valve wheel. This is accomplished by a driver that is fastened to the decimal ring. Once per completed turn, the driver influences a radially outward positioned intermediate wheel, which in turn influences the digit ring which is position radially inward. The digit ring provides a full turn indication.

Additional characterizing features and advantages of the invention are explained in the following description, reference being made to the enclosed drawings, which in detail show only a few exemplifying embodiments.

BRIEF DESCRIPTION OF THE DRAWINGS

FIG. 1 is a bottom plan view of a valve wheel made in accordance with the present invention.

FIG. 2 is an elevation view of a valve wheel made in accordance with the present invention.

FIG. 3 is a top plan view of a valve wheel made in accordance with the present invention.

FIG. 4 is a sectional view along the line 4—4 taken on FIG. 1.

FIG. 5 is a bottom plan view of a wheel house made in accordance with the present invention.

FIG. 6 is an elevation view of a wheel house made in accordance with the present invention.

FIG. 7 is a section view along the line 7—7 taken on FIG. 5.

FIG. 7A is an enlarged partial section view of a recess having a narrow shoulder with a holding lug made in accordance with the present invention.

FIG. 7B is an enlarged partial section view of an inner wall of a casing having a locking shoulder made in accordance with the present invention.

FIG. 12 is an elevation view of the decimal ring made in accordance with the present invention.

FIG. 12A is an enlarged partial sectional view of a second spacer edge axially extended from an exposed flange of the decimal ring made in accordance with the present invention.

FIG. 13 is a bottom plan view of an intermediate wheel made in accordance with the present invention.

DETAIL DESCRIPTION OF THE INVENTION

Figure 8:
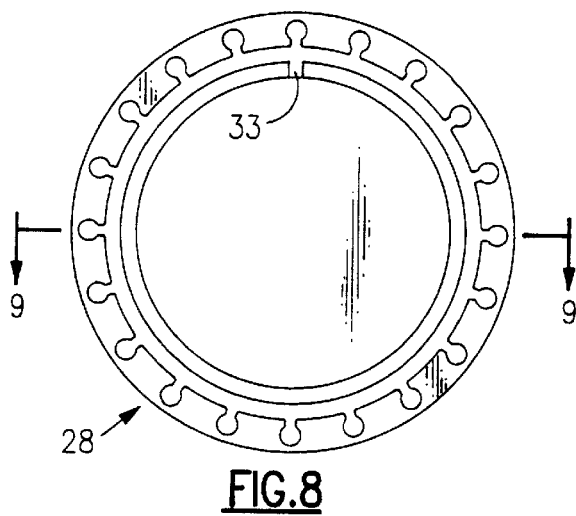
FIG. 8 is a bottom plan view of a digit ring made in accordance with the present invention.

In the drawings, a position indicating valve wheel 1 according to the invention is shown in its entirety. A wheel house 2 is made by injection molding a plastic material or die-casting aluminum. With reference to FIG. 5, the wheel house 2 is preferably star-shaped with four blunt wings 3, a mainly cylindrical casing 4 that connects the bases of the wings, and provided with a central bore 8. The wings 3 and the casing 4 extend axially from a face 5 of the house 2 to a back 6, which is open (FIG. 6). Consequently, the interior of the casing and the wings is hollow.

As shown in FIG. 3, the face 5 of the house is provided with use symbols 7. These symbols 7 can be provided by a stamping process, applying a pressure sensitive labels, or the like. Around the central bore 8, a recess 9 is provided to insert a marking plate 10. In FIG. 4, a pin 11 fastens the marking plate 10 to a spindle screw 12 that has a bore 13 and a screw head 14. The pin 11 is frictionally engaged with the bore 13. The pin 11 may also have an axial through bore 55 to allow the introduction of a tool (not shown), which can be used to set the valve without a disassembly.

In FIG. 7, the central bore 8 is concentrically surrounded by a hub 15, which in the axial direction is somewhat shorter than the wings 3 and the casing 4. The hub 15 has a continuous inner grooving or the like 16. In FIG. 4, the inner grooving 16 engages with a corresponding outer grooving or the like 17 on a spindle end 18 in order to prevent a relative rotation between the wheel house 2 and the spindle end 18.

As shown in FIG. 7, between the base of a wing 3 and the hub 15, an axial through recess 19 is provided in the face of the wheel house. This recess 19 is subdivided into two windows. The first window 20 allows for an indication of the number of full turns of the valve wheel. The second window 21 allows for an indication of the portions of a turn of the valve wheel. The recess 19 is preferably T-shaped; the base portion of the T forming the first window 20 and the cross portion of the T forming the second window 21, in which a somewhat larger indicating area is preferred.

With reference to FIGS. 5 and 7, the wing 3 that is radially connected to the recess 19, is not limited like the other wings 3 by an arc-shaped casing portion 4. Instead, the casing within this area protrudes into the interior of the wing and principally follows the wing sides to form approximately a quarter-circle 22 having an axial pin 23 as its center of curvature. The axial pin 23 projects away from a back side of the face 5 of the house 2 and has a length, which is approximately the same as half the length of the casing. In addition, the axial pin 23 projects from an area that is substantially close to a circular extension of the casing 4.

Figure 9A:
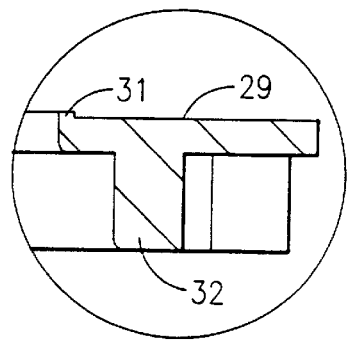
FIG. 9A is an enlarged partial sectional view a first spacer edge axially extended from an exposed surface of the digit ring made in accordance with the present invention.
Figure 10:
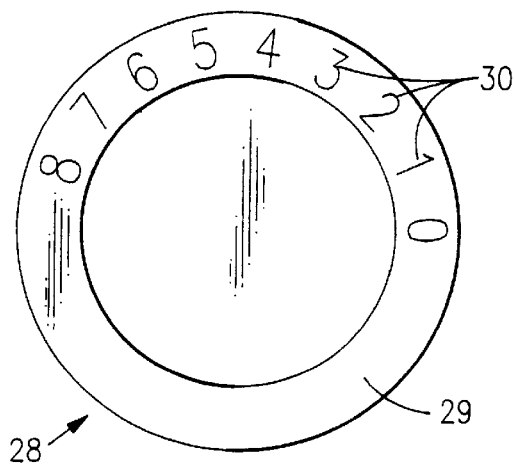
FIG. 10 is a top plan view of the digit ring according to FIGS. 8 and 9.

In FIG. 7, a bottom surface 24 is enclosed by the casing 4. In the bottom surface 24, a recess 25 is concentrically made about the hub 15, thus providing a narrow shoulder 26 adjacent to the casing 4. From a free edge, which delimits the shoulder 26 laterally, three holding lugs 27, arranged at equal angular distances from each other, project into the recess 25 (FIG. 7A). The holding lugs 27 retain a digit ring 28 that is inserted into the recess. The digit ring 28 is sized so that it covers only the first window 20 in the radial direction. In FIG. 10, the digit ring 28 has an exposed surface 29, which is exposed to this window 20. The exposed surface 29 is provided with digits 30, which correspond to the number of full turns of the valve wheel, in the circumferential direction of the ring. In FIG. 9A, the exposed surface 29 is delimited at its inner edge by an axially outstanding spacer ring 31. The spacer ring 31 distances the exposed surface 29 from the recess 25 to prevent frictional engagement between the exposed surface 29 and the recess, thus preventing the digits 30 from being worn off.

Figure 8A:
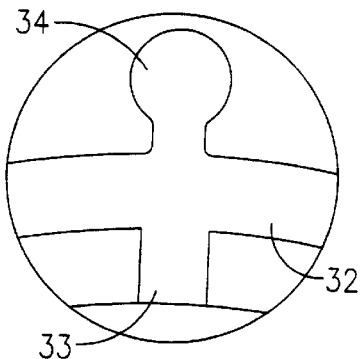
FIG. 8A is an enlarge partial top plan view of a cog ring having a shaped cog and a positioning shoulder made in accordance with the present invention.
Figure 9:
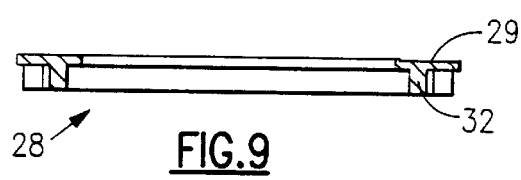
FIG. 9 is a section view along the line 9—9 taken on FIG. 8.

In FIGS. 8 and 9, the non-exposed side of the digit ring 28 has a cog ring 32 that projects axially. The cog ring 32 is somewhat distanced from the inner edge of the digit ring 28 and substantially distanced from the outer edge of the digit ring 28. From the cog ring 32, in a place corresponding to a 0-adjustment, a positioning shoulder 33 projects radially inward (FIG. 8A). The positioning shoulder 33 allows the digit ring 28 to be easily inserted into the wheel house 2 in the required starting position. A plurality of cogs 34 project radially outward from the cog ring 32 at even intervals and can roughly have a cylindrical shape axially, a uniform link to the cog ring 32, and a termination in axial direction at the level of the free axial end of the cog ring 32. In the radial direction the cogs 34 can, through approximately a quarter of their radial range, be uniformly connected to the cog ring 32.

The digit ring 28 and an intermediate wheel 35 interact and the latter is rotatively mounted on the axial pin 23 (FIG. 4). Referring to FIG. 13, the intermediate wheel 35 has a plurality of driving cogs 36. Adjacent driving cogs 36 are connected together by two straight wall extensions 57 having a semi-cylinder wall 58 therebetween. The straight walls and the semi-cylinder wall define a semi-cylindrical space 56 between adjacent driving cogs 36 that receives a cog 34 of the digit ring 28. Each driving cog 36 has a periphery 59 that essentially follows a cylindrical surface. As a result, the space between adjacent cogs 34 of the digit ring 28 is always being filled maximally by the driving cogs 36 of the intermediate wheel 35. Also, omissions during the interaction between the digit ring 28 and the intermediate wheel 35 are prevented, even after some wear. Each driving cog 36 may be provided with a central axial through hole 60, which saves material as well as guarantees, to a large extent, shape stability, deviating sunken thicker portions being counteracted. The intermediate wheel 35 is provided with a cylindrical bore 37 that leaves a bottom 61 at one of the axial ends of the wheel, about a pin hole 38. From the bottom 61, two opposed holding shoulders 39 project axially into the bore 37. The shoulders 39, at least at their free ends, have a smaller mutual distance than the axial pin 23 diameter, so that the intermediate wheel 35 can be frictionally secured to and rotate about the axial pin 23.

An exposed flange 41 of a decimal ring 40 abuts the recess 25 radially inside the digit ring (FIG. 4). Referring to FIG. 12, the exposed flange 41 projects radially outward from one end of a guide cylinder 42. The other end of the guide cylinder is connected to a concentric sleeve 43 that has a somewhat larger diameter. This sleeve is designed to be slipped onto a protruding top portion 44 of the valve and prevent a relative rotation between the top portion 44 and the decimal ring 40 by providing it with a locking projection 45 (FIG. 4). The locking projection engages with the top portion in a tongue and groove-fashion in the radial direction. Referring to FIG. 1, the locking projection can be provided with at least one axial spring 47, which projects radially inward from a web 46. The projection is designed to allow tolerances.

In FIG. 12, the transition area between the guide cylinder 42 and the sleeve 43 coincides with a support flange 48 that projects radially outward and is surrounded by a resilient collar 49. The collar projects radially outward at an angle of preferably about 15 degrees from the longitudinal axis. In FIG. 4, when the decimal ring 40 is inserted into the wheel house 2, the resilient collar 49 is depressed within the casing 4. The collar resiliently snaps into at least one locking shoulder 50 at the inner side of the free end of the casing (FIG. 7B). In this way, the house 2, the digit ring 28, the intermediate wheel 35 and the decimal ring 40 are operatively connected to each other.

Referring to FIGS. 4 and 12, from a location close to the periphery of the support flange, a driving pin 51 projects axially from the support flange, away from the concentric sleeve 43. The driving pin 51 is sized and positioned to enter a semi-cylindrical space 56 in the intermediate wheel 35, as the wheel house 2 is turned. In this way, the driving pin 51 causes the intermediate wheel 35 to rotate one graduation. This rotational movement is translated to the digit ring, which is rotated a corresponding graduation. Consequently, the digit ring will indicate a higher or lower number of full turns.

Figure 11:
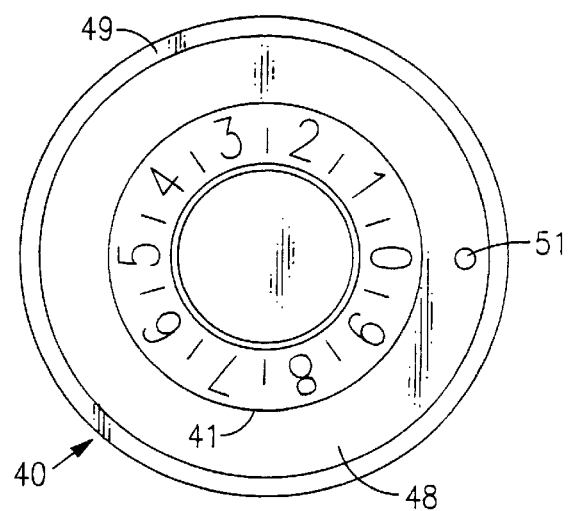
FIG. 11 is a top plan view of a decimal ring made in accordance with the present invention.

In FIG. 11, the exposed flange 41 is, on its free end surface, provided with a numbering around its periphery. The numbering usually comprises the digits 0–9, which correspond to the tenths of a full turn. Also, like the digit ring, the exposed flange 41 is provided with an outer spacer ring 52, which prevents the numbering from wearing off (FIG. 12A).

In FIG. 4, the open area between the casing 4 and the resilient collar 49 can be covered by a shape-complimentary protective device 53 having a small flange 54 that abuts the resilient collar.

The position indicating valve wheel according to the present invention is to be mounted on a valve top piece 44 and fastened to the spindle end 18 by means of a spindle screw 12 and hub 15 having the design described above.

Subsequent to a preliminary adjustment or setting of the valve body, the wheel house 2 is turned in counter-clockwise direction to remove the valve body from its matching seat, thus opening the valve. Each full turn of the wheel house is indicated in the first window 20 and the portions of each turn are indicated in the second window 21. This is accomplished since the decimal ring 40 is non-rotatively mounted to the valve top piece 44 by means of the locking projection 45–47. Consequently, as the wheel house 2 rotates, the second window 21 traverses the circumference of the exposed flange 41, allowing the underlying digit to be viewed in the second window 21. When the driving pin 51 on the decimal ring 40 passes the intermediate wheel 35, it enters into a semi-cylindrical space 56, causing the intermediate wheel to rotate one graduation. The driving cogs 36 of the intermediate wheel 35 are in constant meshing communication with the cogs 34 of the digit ring 28. Consequently, the rotational movement of the intermediate wheel is translated from the driving cogs 36 to the cogs 34 of the digit ring 28. The graduation corresponds to the angular distance between two adjacent digits 30 on the exposed surface 29 of the digit ring 28. Thus, the digit ring indicates the number of full turns of the valve wheel quickly and reliably, which can be viewed through the first window 20. Due to the fact that the intermediate wheel 35 is friction locked on the axial pin 23, the indicating position of the digit ring 28 is reliably and accurately maintained. Additionally, the position stabilization is enhanced since the digit ring 28 is subjected to a friction locking force of the holding lugs 27 that press the digit ring 28 into the recess 25.

I claim:

1. A position indicating valve wheel which rotates a spindle end of a valve and indicates a full turn position and a partial turn position of a valve body relative to a top portion of the valve, comprising:

a wheel house having a center lying along a central axis;

a decimal ring in the wheel house mounted for rotation about the central axis and having a decimal indicating mechanism to indicate the partial turn position of the valve wheel;

a driver rigidly secured to the decimal ring and being located radially outward from the central axis;

an intermediate wheel rotatably secured to the wheel house and being positioned such that the driver temporarily engages with the intermediate wheel with each full turn of the wheel house, and the driver urging the intermediate wheel to rotate during the temporary engagement; and a digit ring being rotatably secured to the wheel house and being in constant rotating communication with the intermediate wheel such that rotation of the intermediate wheel urges the digit ring to rotate, and said digit ring having a digit indicating mechanism to indicate the full turn position of the valve wheel.

2. A position indicating valve wheel as claimed in claim 1, wherein the wheel house further comprises:

a star-shaped face having a front side and a rear side;

a substantially cylindrical casing extended axially from the rear side of the star-shaped face;

at least one blunt wing extended radially outward from the casing and extending axially from the rear side of the star-shaped face; and the wing and the casing having a hollow interior.

3. A position indicating valve wheel as claimed in claim 2, wherein the star-shaped face further comprises:

at least one use symbol provided on the front side of the star-shaped face;

a marking plate recess provided in the front side of the star-shaped face; and a marking plate inserted into the marking plate recess.

4. A position indicating valve wheel as claimed in claim 2, wherein the star-shaped face further comprises:

an axially through first window provided in the star-shaped face to allow the digit indicating mechanism to be exposed through the star-shaped face; and an axially through second window provided in the star-shaped face to allow the decimal indicating mechanism to be exposed through the star-shaped face.

5. A position indicating valve wheel as claimed in claim 4, wherein the wheel house further comprises:

a quarter-circle portion of the casing that protrudes radially outward into the interior of one wing;

the first and second windows being located radially inward from the quarter-circle portion of the casing;

an axial pin axially projected from the rear side of the star-shaped face and being located at a center of curvature of the quarter-circle portion of the casing; and the intermediate wheel being rotatably secured to the axial pin.

6. A position indicating valve wheel as claimed in claim 5, wherein the wheel house further comprises:

a hub extended axially from the rear side of the star-shaped face and having a central bore about the central axis; and an inner groove on an inside surface of the bore, said inner groove adapted to threadably engage with an outer groove on the spindle end of the valve to prevent relative rotation between the wheel house and the spindle end.

7. A position indicating valve wheel as claimed in claim 6, wherein the decimal indicating mechanism further comprises:

an exposed flange secured to an axial end of the decimal ring and having a top surface; and a decimal indicia provided on the top surface that corresponds to the partial turn position of the valve body.

8. A position indicating valve wheel as claimed in claim 7, wherein the digit indicating mechanism further comprises:

an exposed surface on the digit ring; and a digit indicia provided on the exposed surface that corresponds to the full turn position of the valve body.

9. A position indicating valve wheel as claimed in claim 8, wherein the wheel house further comprises:

a recess provided in the rear side of the star-shaped face about the hub and surrounded by the casing, said recess having a narrow shoulder adjacent the casing;

the first window being located radially outward of the second window, the exposed surface of the digit ring circumscribing the top surface of the exposed flange, and the exposed surface and the top surface being inserted into the recess so that the digit indicia appears in the first window and the decimal indicia appears in the second window; and a plurality of holding lugs projected radially inward from the narrow shoulder and frictionally engaged with the digit ring to act against a relative rotation between the digit ring and the wheel house.

10. A position indicating valve wheel as claimed in claim 9, wherein the digit ring further comprises:

a first spacer ring axially projected from an inner edge of the exposed surface such that the exposed surface is spaced from a bottom of the recess to protect the digit indicia from wear.

11. A position indicating valve wheel as claimed in claim 10, wherein the decimal ring further comprises:

a second space ring axially projected from an outer edge of the top surface of the exposed flange such that the top surface is spaced from the bottom of the recess to protect the decimal indicia from wear.

12. A position indicating valve wheel as claimed in claim 11, wherein the digit ring further comprises:

a cog ring projected in the axial direction from a non exposed surface of the digit ring;

a plurality of shaped cogs projected radially outward from the cog ring having spaces therebetween;

the intermediate wheel being correspondingly shaped to have driving cogs with receiving spaces therebetween such that the shaped cogs of the digit ring matingly engage with the receiving spaces of the intermediate wheel;

the driver being shaped to matingly engage with the receiving spaces of the intermediate wheel; and the shaped cogs having a substantially cylindrical shape.

13. A position indicating valve wheel as claimed in claim 12, wherein the digit ring further comprises:

a positioning shoulder projected radially inward from the cog ring and being circumferentially positioned to correspond to a zero-adjustment of the valve body to accommodate an assembly of the valve wheel.

14. A position indicating valve wheel as claimed in claim 12, wherein the intermediate wheel further comprises:

a central cylindrical bore that has a bottom with an axial pin hole extending through said bottom;

a plurality of opposed holding shoulders axially projected from the bottom into the bore, said holding shoulders having a distance between the free ends of opposed holding shoulders that is substantially smaller than a diameter of the axial pin hole such that the intermediate wheel is locked onto the axial pin.

15. A position indicating valve wheel as claimed in claim 14, comprising:

a plurality of locking shoulders that project radially inward from an inner wall of the casing;

a guide cylinder axially extended from the top flange away from the rear side of the star-shaped face;

a concentric sleeve having a first end connected to the guide cylinder and a second end adapted to receive the top portion of a to prevent a relative rotation between the decimal ring and the top portion;

a support flange extended radially outward from the first end of the concentric sleeve, wherein the driver axially projects from the support flange towards the rear side of the star-shaped face; and a resilient collar extended radially outward from the support flange at a predetermined angle, being recessed into the interior of the casing and resiliently snapped under the locking shoulders.

16. A position indicating valve wheel as claimed in claim 15, wherein the predetermined angle is about 15° from the axial direction; and the second end of the concentric sleeve further comprises a projection which extends radially inward from an inner surface of the second end of the concentric sleeve, said projection interlocks with a corresponding projection on the top portion of the valve to prevent relative rotation between the decimal ring and the top portion of the valve.

17. A position indicating valve wheel as claimed in claim 15, wherein the driver rotates the intermediate wheel one graduation during the temporary engagement, the rotation of the intermediate wheel being translated to the digit ring such that the digit ring is rotated a corresponding graduation to indicate the full turn position of the valve wheel.

18. A position indicating valve wheel as claimed in claim 15, further comprising:

a shape-complementary protection element frictionally captured between the quarter-circle portion of the casing and the resilient collar to cover the interior of the casing.

19. A position indicating valve wheel as claimed in claim 14, wherein the decimal indicia comprises the sequential digits of 0–9, with each sequential digit corresponding to a tenth of a full turn.

20. A position indicating valve wheel which rotates a spindle end of a valve and indicates a full turn position and a partial turn position of a valve body relative to a top portion of the valve, comprising:

a wheel house having a center being located along a central axis;

a decimal ring in the wheel house mounted for rotation about the central axis and having a decimal indicating mechanism to indicate the partial turn position of the valve wheel, and the wheel house being rotatable about the central axis relative to the decimal ring;

a driver secured to the decimal ring and being located radially outward from the central axis;

an intermediate wheel rotatably secured to the wheel house and being located radially outward from the driver such that the driver temporarily engages with the intermediate wheel with each full turn of the wheel house, and the driver urging the intermediate wheel to rotate during temporary engagement; and a digit ring rotatably secured to the wheel house about the central axis and being in constant rotating communication with the intermediate wheel such that the rotation of the intermediate wheel urges the digit ring to rotate, and said digit ring having a digit indicating mechanism to indicate the full turn position of the valve wheel.

* * * * *